R. R. ROBERTS.
DESHIVING AND DECORTICATING MACHINE.
APPLICATION FILED NOV. 26, 1918.

1,405,004.

Patented Jan. 31, 1922.
5 SHEETS—SHEET 1.

Robert R. Roberts
Inventor

Inventor
Robert R. Roberts

R. R. ROBERTS.
DESHIVING AND DECORTICATING MACHINE.
APPLICATION FILED NOV. 26, 1918.
1,405,004.
Patented Jan. 31, 1922.
5 SHEETS—SHEET 5.
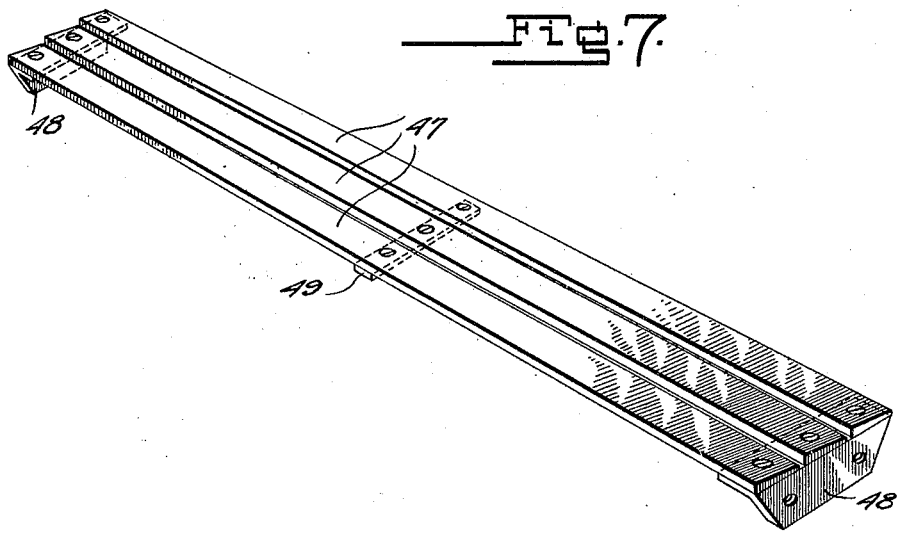
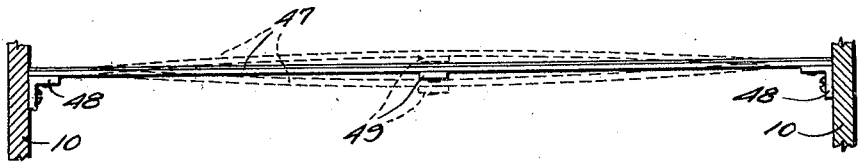
Inventor
Robert R. Roberts,

UNITED STATES PATENT OFFICE.

ROBERT R. ROBERTS, OF WASHINGTON, DISTRICT OF COLUMBIA.

DESHIVING AND DECORTICATING MACHINE.

1,405,004. Specification of Letters Patent. Patented Jan. 31, 1922.

Application filed November 26, 1918. Serial No. 264,224.

*To all whom it may concern:*

Be it known that I, ROBERT R. ROBERTS, a citizen of the United States, residing at Washington, in the District of Columbia, have invented certain new and useful Improvements in Deshiving and Decorticating Machines, of which the following is a specification.

The present invention relates to a machine for de-shiving and decorticating exogenous fibrous plants.

The object of this invention is to improve the machine set forth in Patent #1,132,122, granted on my invention March 16, 1915. In this prior machine, there is a tendency for the fiber to adhere to and follow the decorticating rollers; and the shives are not altogether satisfactorily removed from the fiber during the operation. These disadvantages are overcome by a peculiar relative arrangement of the successive pairs of de-shiving and decorticating rollers, and a peculiar construction of the rollers combined with vibratory reticulated separating aprons or supports for the decorticated plant stalks.

A feature of the present invention is in the provision of fixed and movable mountings for each pair of decorticating rollers, and the provision of a novel means in conjunction with the movable mounting for yieldingly maintaining it in position toward the fixed mounting, the yielding means being adjustable as to pressure, and also in the provision of means for adjustably limiting the separating movement of the mounting.

The above and other more or less important objects and advantages of this invention will be brought out more in detail in, and understood from the following detailed description of the present preferred embodiment, the same being illustrated in the accompanying drawings, wherein:

Figure 7 is a detail perspective view of the sifting or separating apron employed.

Figure 8 is a fragmentary transverse section through the frame, showing one of the separating aprons in position, the dotted lines illustrating the positions of the apron incident to the vibration of the frame by the operation of the machine.

Figure 1:
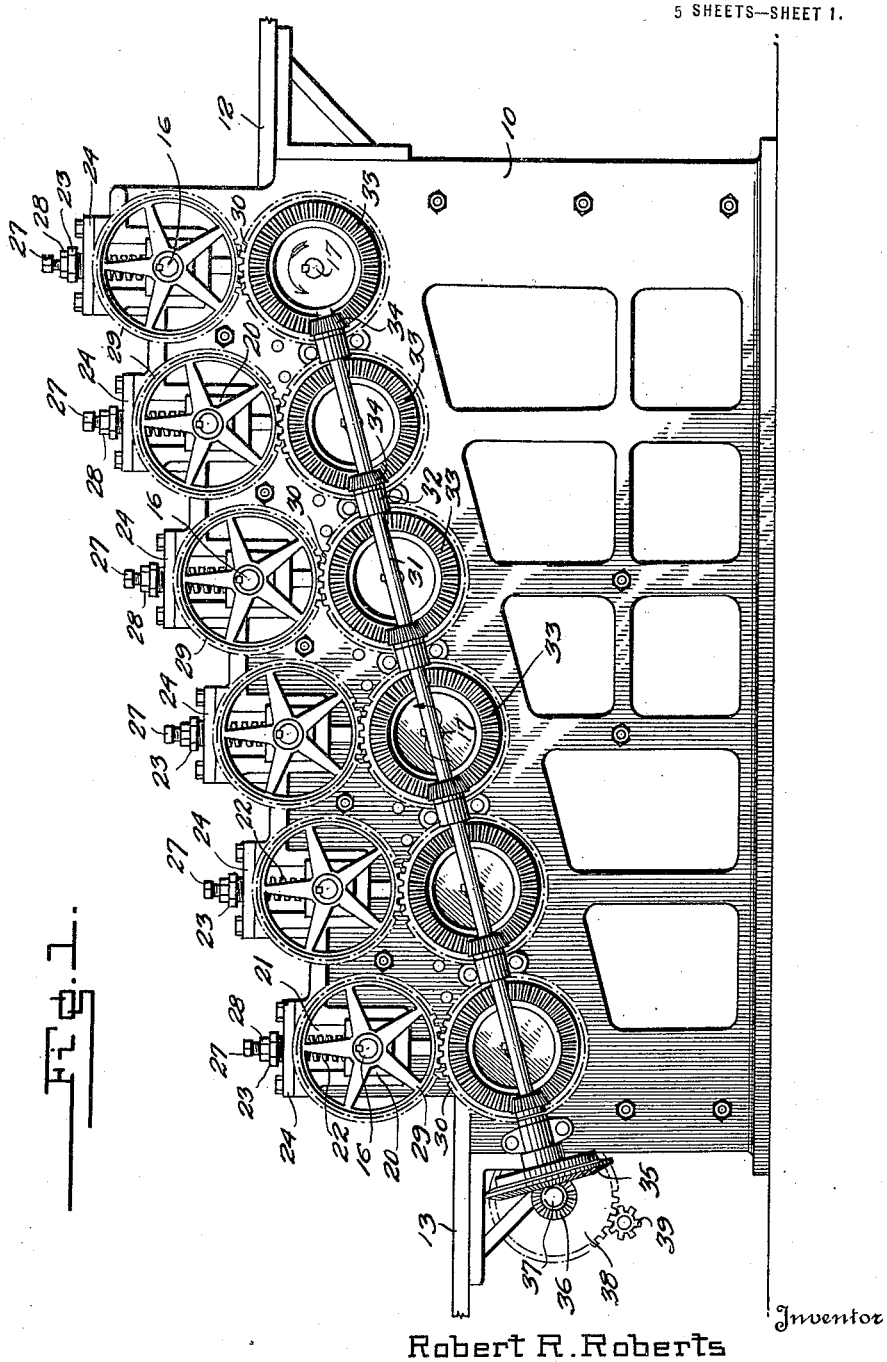
Figure 1 is a side elevation of a de-shiving machine constructed according to the present invention.

Referring to the drawings, the machine is provided with a frame of any suitable construction, the present illustration disclosing spaced apart sides 10 held together by braces 11 or the like and provided at its forward end with a feed table 12, and at its rear end with a receiving table 13, both disposed horizontally, and the feed table 12 being arranged in a horizontal plane spaced above the horizontal plane of the receiving table 13.

Figure 3:
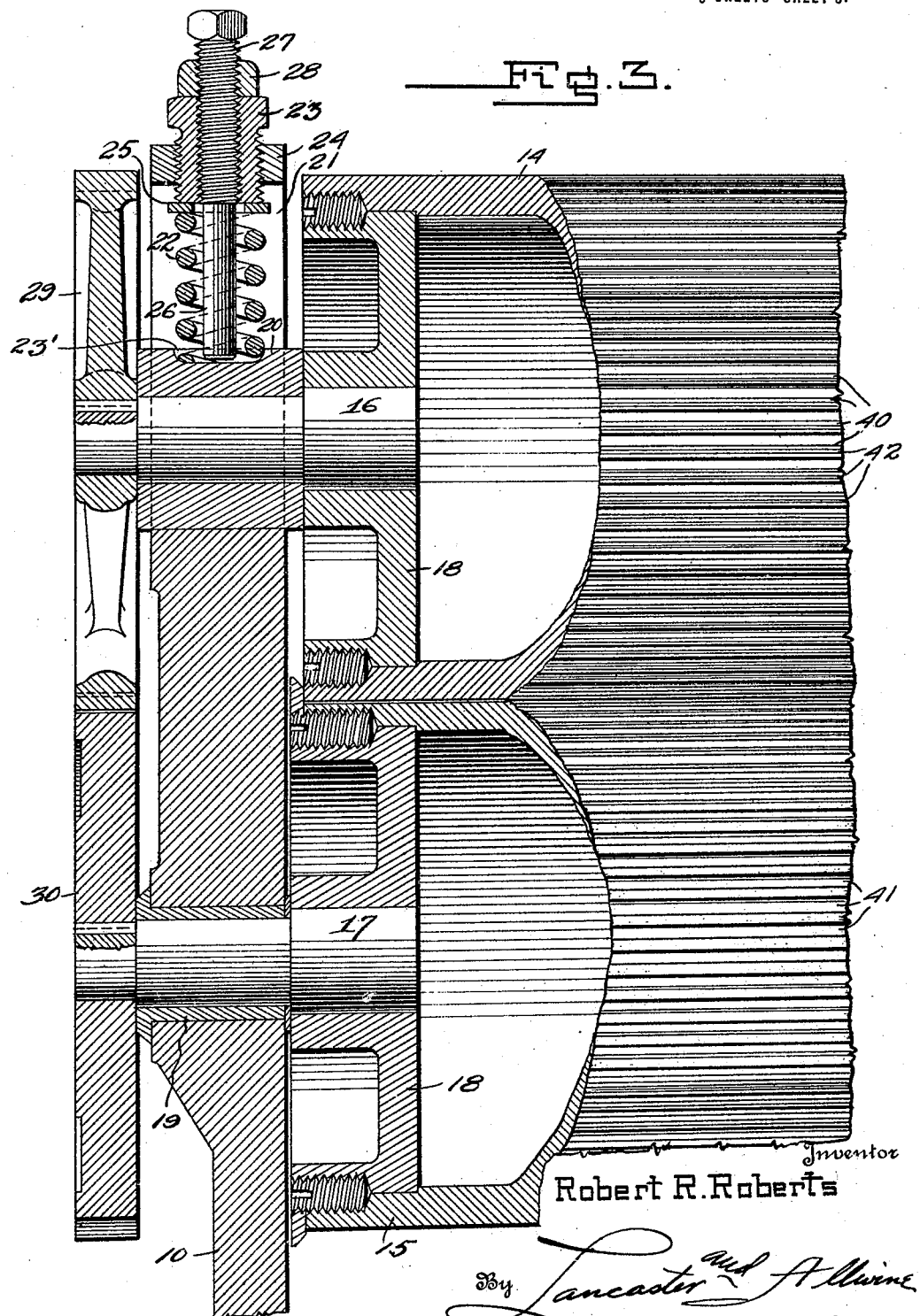
Figure 3 is a fragmentary enlarged sectional view taken through a pair of rollers at one side of the machine, showing the fixed and adjustable mountings for the rollers.

Arranged in evenly spaced apart relation relative to the length of the frame 10, and extending transversely between the sides of the frame, are pairs or sets of rollers arranged in any desired number and being preferably graduated in certain predetermined proportions from end to end of the frame. In the present instance, the forward end of the frame is provided with two pairs or sets of the initial cracking or loosening rollers 14 and 15 mounted on transverse shafts 16 and 17 respectively, with the roller 14 arranged above the roller 15. As shown in the several views of the drawings, the axes of the shafts 16 and 17 of each set of rollers are arranged in the same vertical plane, and the point of working between the rollers 14 and 15 lies in a plane at right angles to that of the shafts 16 and 17 or in a horizontal plane. While the rollers 14 and 15 may have a body construction of any desired form, the construction illustrated in Figure 3 is preferred and wherein the body of each roller is in the form of a hollow cylinder closed at its end by a head or plug 18 provided with a central hub portion, into which is fixed a section of the adjacent shaft, such as 16 in the case of the upper roller 14, and as 17 in the case of the lower roller 15. The sections of the shafts 16 and 17 project beyond the ends of the adjacent rollers 14 and 15, and the lower shaft 17 has bearing in a bushing 19 or the like fixed in the side 10 of the frame. The upper shaft 16 has bearing in a vertically moving bearing block 20 fitting in a vertical way 21 formed in the upper portion of the side 10 of the frame, and which is normally held in the bottom of the way and toward the fixed bearing bushing 19 by a tension spring 22. The spring 22 is of helical form and bears at its lower end in a seat 23' formed in the top of the bearing block 20, and bears at its upper end against an adjusting screw 23 threaded in a strap 24 which closes the upper end of the way 21 and which is carried upon the side 10 of the casing. Preferably a washer 25 is interposed between the upper end of the spring 22 and the adjusting screw 23 to form a suitable bearing for the spring and admit of the free turning of the adjusting screw 23 in varying the tension of the spring against the bearing block 20. For the purpose of limiting the upward movement of the bearing block 20 against the tension of the spring 22, a stop pin 26 is employed, the same projecting downwardly from a machine screw 27, which is threaded in the adjusting screw 23, a lock nut 28 being threaded upon the screw 27 and adapted to bind the same against the screw 23, for holding the screws in their relative adjusted positions. By providing this device, the upper shaft 16 is capable of movement, under certain conditions hereinafter pointed out, from the lower shaft 17 and such movement is restricted by the stop pin 26, the tension device 22 and the stop pin 26 being both independently and relatively movable to suit varying conditions met with in the use of the machine.

The sets of rollers throughout the length of the machine are preferably of the same diameter and are adapted to be driven at the same rate of speed, any suitable driving means adaptable for the purpose may be employed and a preferred form of gear driving mechanism being illustrated. In the present illustration, the upper shafts 16 are each provided with a spur gear wheel 29 keyed or otherwise suitably secured upon the shafts 16, and upon each lower shaft 17 is keyed or otherwise suitably secured a combined spur and crown gear wheel 30, the peripheral teeth of which are adapted to mesh with the spur gear wheel 29 of the upper shaft 16. A shaft 31 is supported in the spaced apart bearings 32 along one side of the frame, and is provided at points opposite the crown teeth 33 of the gear wheels 30 with pinions 34 adapted to mesh with the crown gear wheels and drive the same. At preferably one end of the machine, the shaft 31 is provided with a drive beveled gear wheel 35 meshing with a pinion 36, carried upon a shaft 37 to which is secured a spur gear wheel 28 with which meshes a driving pinion 39 driven in any suitable manner, not illustrated. It will be readily appreciated that, by the provision of this gearing mechanism, all of the rollers in the machine are driven simultaneously and at the same rate of speed.

While all of the rollers in the machine are of identical body construction, and mounted and driven in the same manner, the peripheral or working surfaces of these rollers are of varying constructions and types in order to carry out the function of the machine to the highest degree. In the present instance, the rollers are divided into two sets of finishing or delivery rollers. Each set may be different from the others, but preferably two of each set are employed, and if desired the succession of initial, intermediate and final rollers may be interchanged to suit the work to which the machine may be put.

Figure 4:
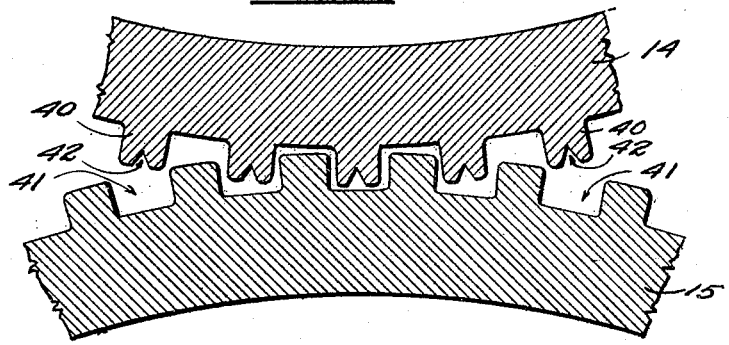
Figure 4 is a fragmentary enlarged sectional view taken through the adjacent co-operating portions of a pair of rollers, illustrating the inter-meshing ribs or surface projections of the rollers relatively large and of a peculiar construction, these rollers being preferably the initial or coarse breaking rollers of the machine.
Figure 5:
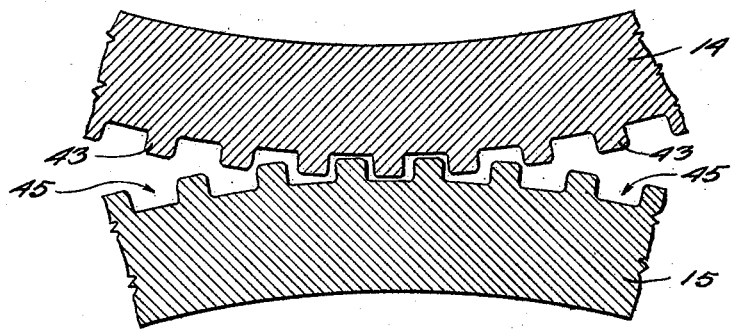
Figure 5 is a similar view illustrating the secondary or intermediate rollers of the machine and showing the ribs or projections thereof inter-meshing and of less height and width than those of the first or initial rollers.
Figure 6:
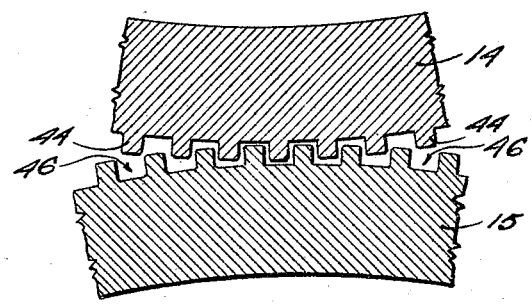
Figure 6 is a like view illustrating the rollers of a still finer mesh, and which may be used for the final decorticating or de-shiving of the plant stalk.

As shown in Figure 4, the initial pair or set of rollers is of a construction adapted to first receive the stalks of flax, jute, or other fibrous plant, for initially bending and cracking the cortex thereof, the broad principle of such operation being set forth and covered in my prior patent above referred to. According to the present invention, the upper roller 14 is provided with equi-distantly spaced apart and longitudinally extending ribs or projections 40 which are received in grooves or channels 41 formed in the subjacent roller 15, the ribs 40 and grooves 41 being so relatively dimensioned that at no time do the adjacent walls thereof contact. The coacting surfaces of the rollers 14 and 15, therefore, at no time are actually brought together, but intermesh in spaced relation at opposed points. The coacting surfaces do, however, contact with the material passing through the machine, and such points of contact of the rollers are substantially in a common horizontal plane, and may be considered as the single point of contact of each pair of rollers. The stalks received between the coacting portions of the rollers 14 and 15 are thus pressed there-between without damage to the fibers of the plants and resulting only in the breaking up of the cortex of the stalks. It is desirable to have the ribs 40 of the initial rollers relatively large for first receiving the unpressed and unbroken stalks, and it has been found by practice that with ribs 40 of the required width, some difficulty is frequently encountered in the adherence of the cortex to the ribs with the result of deflecting the fibers out of their path and causing the same to follow the upward trend of the ribs 40 during the rotation of the rollers 14 and 15. In order therefore to secure the desired crimping and breaking of the cortex, of the stalk, and at the same time to reduce the adhering surfaces of the ribs 40, the latter are each provided with longitudinally extending grooves 42 which provide no support for the portions of the stalk lying between the lateral edges of the grooves, and thus reduce the adhering surfaces or spaces of the ribs 40. Such a construction is found to actually eliminate at all times the adhering of the stalk in substantially a horizontal plane from between the points of meshing of the adjacent set of rolls. As illustrated in Figures 5 and 6, it is not found so essential to provide the grooves 42 in the ribs 43 and 44 of the respective intermediate and finishing rolls, the ribs 43 and 44 being adapted to enter, in properly spaced relation relatively to the walls thereof, the grooves or channels 45 and 46 formed complementally in the subjacent rollers 15 of the respective sets.

The relative sizes and dimensions of the grooves 41, 45 and 46 and their respective ribs 40, 43 and 44, may be as desired and dependent upon the work to be done for the higher efficiency of the machine.

Figure 2:
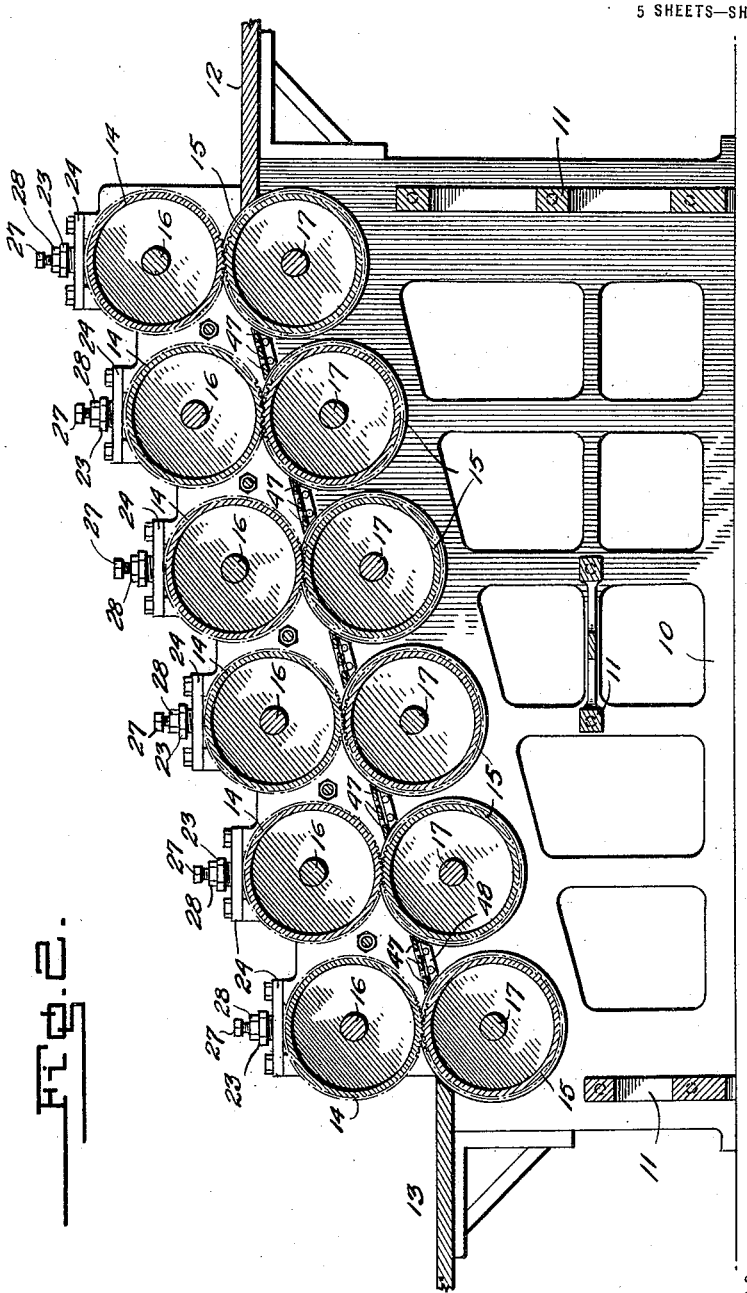
Figure 2 is a longitudinal vertical section taken through the same.

As the stalks are passed between the sets of rollers, it is highly desirable that the ends of the stalks or fiber enter between the points of contact of each set of rollers 14 and 15 in the horizontal plane of the points of contact, and it is known that when the stalk and fiber are pressed, they are relatively pliable and tend to droop or hang down as they pass from between the sets of rollers. To therefor effect the proper feeding of the stalks or fibers into the successive sets of rollers, the sides 10 of the frame are so constructed that the bearings are offset downwardly and successively from the forward to the rear ends of the machine with the result that the horizontal planes when work takes place of the successive sets of rollers 14 and 15 are stepped successively downward at preferably 15° from the preceding plane of contact. Such construction and arrangement is illustrated in Figure 2 wherein the axes of each set of pairs of rollers 14 and 15 is disposed in a true vertical plane, and the points of contact of each set of rollers is disposed in a horizontal plane, the horizontal plane of the points of contact being successively stepped downwardly from the forward to the rear end of the machine.

For the purpose of supporting the stalks and fiber between the sets of rolls, aprons are provided, and for the purpose of insuring the separation of the cortices and shives from the fiber, the aprons are constructed to vibrate incident to the running or operation of the machine and to thus set up, automatically, a stripping action upon the crimped stalks for loosening the shives and cortices by gravity into the space beneath the sets of rolls. As shown to advantage in Figures 2, 7 and 8, each apron is formed of a desired number of relatively thin flexible spaced-apart slats 47 secured to the cleats 48 fastened to the inner faces of the sides 10 of the frame in positions between the sets of rolls as shown in Figure 2, for supporting the slats 47 transversely between the sets of rolls, and preferably inclined at 15° or thereabouts to support the stalks and fiber in their passage between the sets of rolls. As shown in Figure 8, when the gearing is operated and the rolls are revolving, the vibration set up in the frame is imparted to the relatively thin flexible slats 47 and the latter are caused to vibrate in the manner illustrated in dotted lines. Such vibration is imparted to the fiber and stalks passing through the machine, and the shives and portions of the cortex still adhering and carried by the fiber are loosened therefrom and permitted to drop by gravity to the spaces between the slats 47. To prevent the closing of the spaces between the slats 47 when the latter are vibrating, spacing strips 49 may be secured across the under sides of the slats 47 in the seats therein, to prevent contact of the adjacent edge portions of the slats, and to insure a somewhat even beating of the slats against the fiber.

From the foregoing it is thought that the operation of this machine is apparent as the latter is carried on, briefly, as follows:

The fibrous plant stalks such as flax, hemp, ramie, jute, milk-weed and other fibrous plants or stalks, are fed over the feed table 12 into the first set of rollers 14 and 15. As the stalks pass between the rollers 14 and 15, the ribs 40 crimp the stalks down into the grooves 41 of the subjacent roller and break the cortex of the stalks and draw the stalks through the set of rollers in a horizontal plane. The ends of the stalks are forced outwardly and over the inclined adjacent apron, the vibration of the machine being imparted to the slats 47 of the apron and the fiber being agitated to separate therefrom the loosened shives and cortex as much as is possible incident to the initial crimping of the stalks. As the end of the stalk naturally hangs down to some extent, it is in position, when extended sufficiently to enter between the second pair or set of rolls without being turned over or deflected by contact with the lower roller 15. The same operation takes place relative to each succeeding set of rollers, so that as the stalks pass through the machine they are successively crimped or broken up at different points throughout their length and the cortex and the shives are loosened and vibrated successively a number of times to insure the freeing of the fiber practically entirely from the shives and the cortex.

By disposing the upper shaft 16 in vertical moving bearing blocks 20, and yieldingly urging the latter down toward the fixed bearing portion 19, the upper rollers 14 are permitted to give or rise, when portions of roots, or thick portions of the stalk are engaged between the rollers, without injury to the rollers or undue crushing of the fiber. Such separation of the rollers 14 and 15, however, must be restricted, in order to maintain the desired and proper mesh between the ribs 40 and the grooves 41 of the sets of rollers. For this purpose, the stop pin 26 is employed, the same being adapted to be adjusted sufficiently above the bearing blocks 20 to permit the same to rise a distance sufficient to allow thick portions of the stalk to pass between the rollers, but to prevent the separation to an extent which would move the upper gear wheel 29 out of mesh with the peripheral teeth of the gear wheel 30. The outer set or adjusting screw 23 of each bearing adjuster, may be adjusted to vary the tension of the adjacent spring 22 against the adjacent bearing block 20, so that the upper roller 14 will exert the desired pressure against the stalk or plant which is to be crimped between the rollers. The bearing adjuster thus not only provides means for adjusting the tension of the upper roller against the lower roller, but also adjustable means for limiting the upward thrust or movement of the upper roller.

I claim:

1. A de-shiving machine having inlet and outlet ends with a downwardly inclined line of feed therebetween, pairs of superposed rollers disposed in the line of feed and contacting in successively downwardly stepped horizontal planes, and aprons arranged between the pairs of rollers.

2. A de-shiving machine having inlet and outlet ends with a downwardly inclined line of feed therebetween, pairs of superposed rollers disposed in the line of feed and contacting in successively downwardly stepped horizontal planes, and aprons arranged between the pairs of rollers and inclined in the general direction of the line of feed.

3. A de-shiving machine having inlet and outlet ends with a line of feed therebetween, pairs of superposed rollers disposed in the line of feed, and vibratory aprons arranged between the pairs of rollers.

4. A de-shiving machine having inlet and outlet ends with a downwardly inclined line of feed therebetween, pairs of superposed rollers disposed in the line of feed, and contacting in successively downwardly stepped horizontal planes, and vibratory aprons arranged between the pairs of rollers.

5. A de-shiving machine having inlet and outlet ends with a line of feed therebetween, pairs of superposed rollers disposed in the line of feed, and spaced apart flexible slats secured between the pairs of rollers and adapted to vibrate incident to the operation of the machine.

6. A de-shiving machine having inlet and outlet ends with a downwardly inclined line of feed therebetween, pairs of superposed rollers disposed in the line of feed and contacting successively in downwardly stepped horizontal planes, and transversely disposed flexible slats secured in spaced relation between the pairs of rollers and adapted to vibrate incident to the operation of the machine for agitating articles passing through the pairs of rollers.

7. A de-shiving machine having inlet and outlet ends with a line of feed therebetween, pairs of superposed rollers disposed in the line of feed, spaced apart slats arranged between the pairs of rollers and secured at opposite ends to the machine and adapted to vibrate incident to the operation of the machine, and means carried upon the intermediate portions of the slats for maintaining the same in spaced relation during vibration.

8. A de-shiving machine having inlet and outlet ends with a downwardly inclined line of feed therebetween, pairs of superposed rollers disposed in the line of feed and contacting in successively downwardly off-set horizontal planes, and aprons arranged between the pairs of rollers and inclining in the general direction of the line of feed, each of said aprons comprising supporting cleats adapted to be secured to the machine, spaced-apart slats secured at opposite ends to said cleats to permit the slats to vibrate intermediate their ends and spacing means secured across the lower faces of the slats to maintain the same in spaced relation during vibration.

9. A de-shiving machine having a feed table at one end, a receiving table at the other end and lying in a lower horizontal plane, spaced aprons arranged between the tables and inclining in the general direction between the tables and independent crimping elements alternately disposed relative to the aprons and having points of contact in successively off-set planes between the tables.

10. A de-shiving machine having a pair of decorticating rollers, one roller having fixed bearings and the other roller having bearings movable toward and from the fixed bearings, tension means for holding the rollers in spaced proximity and a stop for limiting the separation of the rollers.

11. A de-shiving machine having a pair of decorticating rollers, one roller having fixed bearings and the other roller having bearings movable toward and from the fixed bearings, adjustable tension means for holding the rollers in closely spaced-apart relation, and an adjustable stop for limiting the separation of the rollers.

12. A de-shiving machine having a pair of decorticating rollers, one roller having fixed bearings and the other roller having bearings movable toward and from the fixed bearings, adjustable tension means for holding the rollers in closely spaced-apart relation, and a stop for limiting the separation of the rollers.

13. A de-shiving machine having a pair of decorticating rollers, one roller having fixed bearings and the other roller having bearings movable toward and from the fixed bearings, tension means for holding the rollers in closely spaced-apart relation, and an adjustable stop for limiting the separation of the rollers.

14. A de-shiving machine having a pair of decorticating rollers, fixed bearings for one roller, movable bearing blocks for the other roller, springs bearing at one end against the block to hold the rollers in closely spaced-apart relation, adjustable holding means for the other ends of the springs to vary the tension thereof, and an adjustable stop for each block arranged in the path of movement thereof to limit the separation of the rollers.

15. A de-shiving machine having a frame, a fixed roller in the frame, a co-acting movable roller in the frame, including movable bearing blocks, the frame having ways for guiding said block, coil springs arranged in the ways and bearing at one end against the block to urge the rollers into closely spaced-apart relation, adjusting screws carried by the frame and engaging the other ends of the springs to vary the tension thereof against the blocks, and stop pins including screw portions carried in said first screws and adapted for adjustment therethrough to move the stop pins through the springs toward and from the blocks to vary the limit of separation of the rollers.

16. A de-shiving machine having a pair of rollers, one of which is movable toward and from the other, intermeshing gear wheels mounted on the rollers to effect the simultaneous rotation thereof, tension means for holding said rollers and gear wheels in predetermined meshed relation, and admit the separation thereof, and a stop adapted to limit the separation of the rollers and the gear wheel for admitting relatively thick body portions passing between the rollers without disengaging the teeth of the gear wheels.

17. A de-shiving machine having a fixed roller, a roller movable toward and from the fixed roller, inter-meshing gear wheels carried by the rollers for effecting the simultaneous rotation thereof, adjustable tension means for maintaining the rollers and the gear wheels in inter-meshing relation and adapted to yield upon the passage of relatively thick substances between the rollers and an adjustable stop for limiting the separation of the rollers and the gear wheels to prevent the same from movement out of mesh relatively to each other.

ROBERT R. ROBERTS.